(12) United States Patent
Dalsgaard et al.

(10) Patent No.: US 11,542,919 B2
(45) Date of Patent: Jan. 3, 2023

(54) METHOD AND APPARATUS FOR MONITORING THE CONDITION OF A YAW SYSTEM

(71) Applicant: Vestas Wind Systems A/S, Aarhus N. (DK)

(72) Inventors: Søren Dalsgaard, Hadsten (DK); Peter Bøttcher, Egå (DK); Jesper Lykkegaard Neubauer, Hornslet (DK); Anders Yde Wollesen, Aarhus C. (DK); Julio Xavier Vianna Netø, Århus N (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/311,447

(22) PCT Filed: Dec. 17, 2019

(86) PCT No.: PCT/DK2019/050400
§ 371 (c)(1),
(2) Date: Jun. 7, 2021

(87) PCT Pub. No.: WO2020/125897
PCT Pub. Date: Jun. 25, 2020

(65) Prior Publication Data
US 2022/0025866 A1    Jan. 27, 2022

(30) Foreign Application Priority Data

Dec. 20, 2018  (DK) .......................... PA 2018 70840

(51) Int. Cl.
*F03D 17/00*    (2016.01)
(52) U.S. Cl.
CPC .......... *F03D 17/00* (2016.05); *F05B 2260/80* (2013.01); *F05B 2270/301* (2013.01);
(Continued)

(58) Field of Classification Search
CPC .......... F03D 17/00; F03D 1/02; F03D 7/0204; F05B 2260/80; F05B 2270/301;
(Continued)

(56) References Cited

U.S. PATENT DOCUMENTS

2010/0138060 A1    6/2010    Gao et al.

FOREIGN PATENT DOCUMENTS

DE    102008011148 A1    10/2009
EP    2778395 A2    9/2014
(Continued)

OTHER PUBLICATIONS

Danish Patent and Trademark Office, Search and Examination Report in PA 2018 70840, dated Jun. 19, 2019.
(Continued)

*Primary Examiner* — Joseph Ortega
(74) *Attorney, Agent, or Firm* — Wood Herron & Evans LLP (57) ABSTRACT

A first aspect of the invention provides a method of monitoring the condition of a yaw system of a wind turbine, the wind turbine comprising a rotor, the yaw system arranged to control a yaw rotation of the rotor, the method comprising: providing design data 5 representing an expected relationship between yaw moment and yaw rotation speed; measuring a pair of parameters, the pair of parameters comprising a yaw moment parameter indicative of a yaw moment applied to the yaw system, and a yaw rotation speed parameter indicative of a yaw rotation speed caused by the yaw moment; using the design data to evaluate whether the pair of parameters deviates from the expected 10 relationship; and determining a condition of the yaw system on the basis of the evaluation.

15 Claims, 6 Drawing Sheets

(52) U.S. Cl.
CPC ... *F05B 2270/327* (2013.01); *F05B 2270/329* (2013.01); *F05B 2270/335* (2013.01); *F05B 2270/506* (2013.01)

(58) Field of Classification Search
CPC .......... F05B 2270/327; F05B 2270/329; F05B 2270/335; F05B 2270/506; F05B 2260/83; Y02E 10/72
See application file for complete search history.

(56) References Cited

FOREIGN PATENT DOCUMENTS

| | | |
|---|---|---|
| WO | 2018157897 A1 | 9/2018 |
| WO | WO-2018157897 A1 * | 9/2018 |

OTHER PUBLICATIONS

European Patent Office, International Search Report and Written Opinion in PCT Application Serial No. PCT/DK2019/050400, dated Mar. 6, 2020.

* cited by examiner

METHOD AND APPARATUS FOR MONITORING THE CONDITION OF A YAW SYSTEM

FIELD OF THE INVENTION

The present invention relates to the field of yaw systems of wind turbines, and specifically monitoring the condition of said yaw systems.

BACKGROUND OF THE INVENTION

A known yaw system monitor for a multi-rotor wind turbine system is described in WO-A1-2018/157897. The multi-rotor wind turbine comprises a tower with a support structure, at least two wind turbine modules mounted to the support structure and a yaw system arranged to enable rotation of the support structure around the tower. The method comprises applying a yaw moment on the yaw system in order to rotate the support structure, increasing the applied yaw moment towards a yaw moment threshold, measuring a yaw parameter indicative of yaw movement, and determining a condition of the yaw system based on the measured yaw parameter.

The applied yaw moment may be generated by controlling the thrust force of at least one of the wind turbine modules, or by controlling a yaw drive of the yaw system to rotate the support structure.

SUMMARY OF THE INVENTION

A first aspect of the invention provides a method of monitoring the condition of a yaw system of a wind turbine, the wind turbine comprising a rotor, the yaw system arranged to control a yaw rotation of the rotor, the method comprising: providing design data representing an expected relationship between yaw moment and yaw rotation speed; measuring a pair of parameters, the pair of parameters comprising a yaw moment parameter indicative of a yaw moment applied to the yaw system and a yaw rotation speed parameter indicative of a yaw rotation speed caused by the yaw moment; using the design data to evaluate whether the pair of parameters deviates from the expected relationship; and determining a condition of the yaw system on the basis of the evaluation.

Determining the condition of the yaw system may comprise determining whether the yaw system is in a normal condition or a fault condition.

The fault condition may be a stuck fault condition associated with an abnormally low yaw rotation speed. For instance, for a given yaw moment being applied the observed yaw rotation speed may be lower than expected.

The fault condition may be a loose fault condition associated with an abnormally high yaw rotation speed. For instance, for a given yaw moment being applied the observed yaw rotation speed may be higher than expected.

Determining a condition of the yaw system on the basis of the evaluation may comprise determining whether the yaw system is in a normal condition, a stuck fault condition associated with an abnormally low yaw rotation speed, or a loose fault condition associated with an abnormally high yaw rotation speed.

The yaw system may comprise a hydraulic motor connected to a hydraulic circuit, and the yaw moment parameter may be measured by measuring a hydraulic pressure of the hydraulic circuit. Alternatively the wind turbine may comprise plural rotors, and the yaw moment parameter may be measured by estimating a thrust difference between the rotors.

The pair of parameters may be measured when the yaw system is in a stopped state in which it is opposing the yaw moment applied to the yaw system, and the yaw rotation speed may be caused by a slippage of the yaw system. The slippage of the yaw system may be caused by a flow of hydraulic fluid through a relief valve, slippage of a frictional brake, or any other mode of slippage.

The wind turbine may be generating power or thrust as the pair of parameters are measured. Typically as the pair of parameters are measured the wind turbine is in an operational state with the rotor(s) generating thrust.

A time series of pairs of parameters may be measured, each pair of parameters comprising a yaw moment parameter indicative of a yaw moment applied to the yaw system at a respective time and a yaw rotation speed parameter indicative of a yaw rotation speed caused by the yaw moment at the respective time, and each pair of parameters may be evaluated to determine a condition of the yaw system at the respective time.

The yaw rotation speed parameter may be obtained by measuring a yaw rotation speed of the yaw system, for instance using an encoder or other sensor which measures a yaw angle of the yaw system.

The design data may define a region in a parameter space, and the design data may be used to evaluate whether the pair of parameters falls inside or outside the region of the parameter space. Alternatively the design data may define a boundary in a parameter space, and the design data is used to evaluate whether the pair of parameters falls on one or other side of the boundary.

A magnitude of the yaw rotation speed parameter may be used in combination with a magnitude of the yaw moment parameter to evaluate whether the pair of parameters deviates from the expected relationship.

Typically the wind turbine comprising a rotor-nacelle assembly comprising the rotor and an associated nacelle, and the yaw system is arranged to control a yaw rotation of the rotor-nacelle assembly.

A second aspect of the invention provides a monitoring system for monitoring the condition of a yaw system of a wind turbine, wherein the monitoring system is arranged to monitor the condition of the yaw system by performing the method of the first aspect of the invention.

A third aspect of the invention provides a wind turbine comprising: a rotor; a yaw system coupled to the rotor so that the yaw system controls yaw rotation of the rotor; and a monitoring system according to the second aspect of the invention arranged to monitor the condition of the yaw system.

Typically the wind turbine comprising a rotor-nacelle assembly comprising the rotor and an associated nacelle, and the yaw system is coupled to the rotor-nacelle assembly so that the yaw system controls yaw rotation of the rotor-nacelle assembly.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
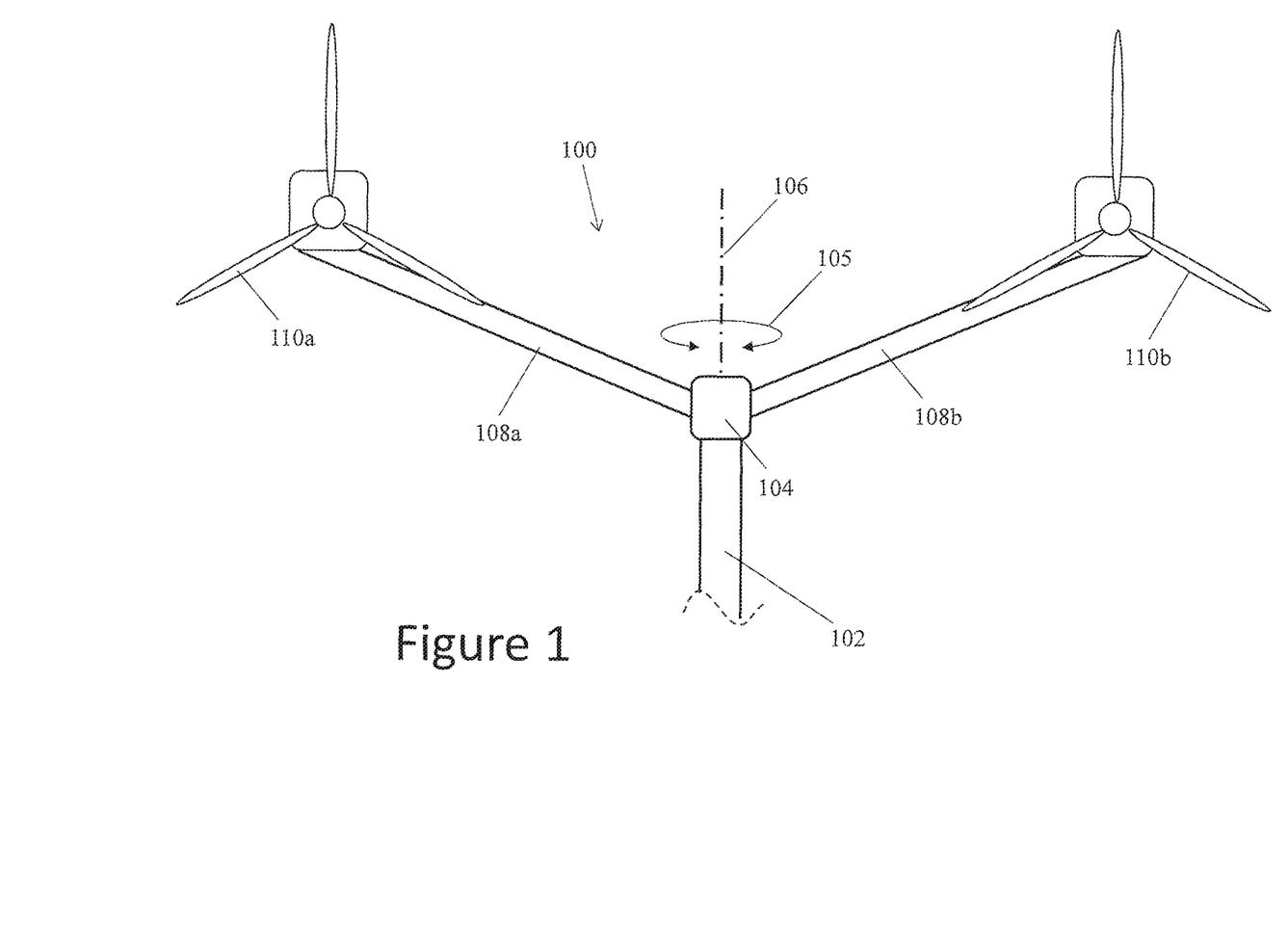
FIG. 1 shows an upper portion of a wind turbine in accordance with an embodiment of the present invention.

FIG. 1 shows a wind turbine 100. The wind turbine 100 comprises a tower 102, only the upper portion of which is shown. The base of the tower 102 may be mounted to the ground; or the wind turbine could be an offshore turbine, in which case the foundation could be fixed to the mudline, or floating.

The wind turbine 100 further comprises a yaw bearing 104 carrying two support arms 108a, 108b. The yaw bearing 104 enables yaw rotation 105 of the support arms 108a, 108b about a vertical pivot axis 106 aligned with a longitudinal axis of the tower 102 in a clockwise or counter-clockwise direction.

Each of the support arms 108a, 108b carries a respective rotor-nacelle assembly comprising a rotor 110a, 110b each with an associated nacelle. The rotors 110a, 110b are configured to rotate to generate electrical power from the wind. Although two rotors 110a, 110b are illustrated in FIG. 1, it will be appreciated that only one rotor may be carried by the tower 102 (in which case there are no support arms), or more than two rotors may be carried by the tower 102. For instance there may be two pairs of rotors as shown in WO-A1-2018/157897, each pair of rotors carried by a respective pair of support arms. In this embodiment each pair of rotors and its respective pair of support arms may be controlled by a respective yaw system, so each yaw system is independent from the other(s), i.e. they can yaw to different angles.

Figure 2:
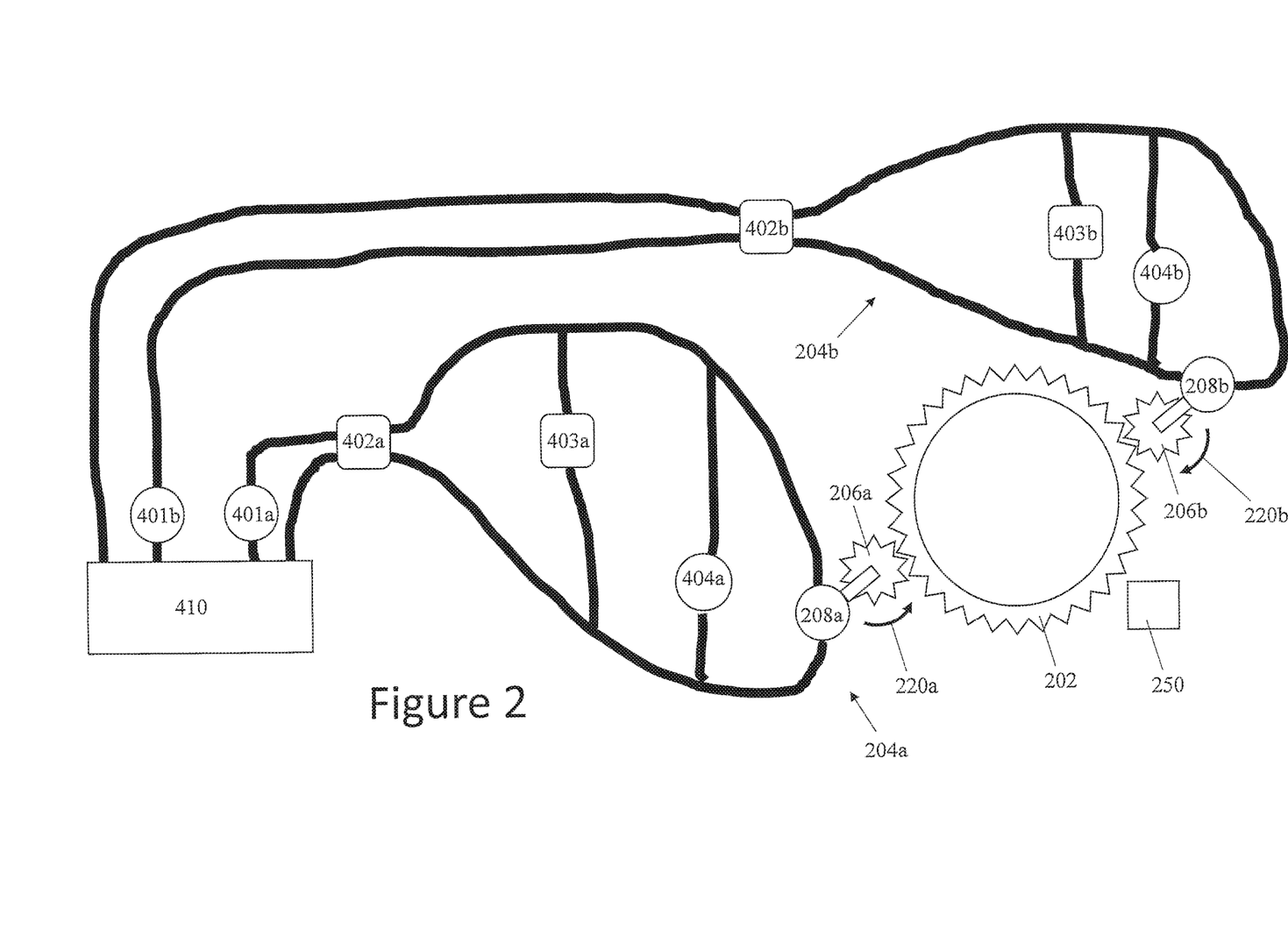
FIG. 2 shows a schematic view of a yaw system in accordance with an embodiment of the present invention.

Turning now to FIG. 2, a yaw system is shown which controls the yaw rotation 105 of the support arms 108a, 108b. The yaw system comprises a yaw gear 202 coupled to the rotors 110a, 110b via the support arms 108a, 108b so that rotation of the yaw gear 202 causes the yaw rotation 105 of the support arms 108a, 108b and their associated rotor-nacelle assembly.

The yaw system comprises independent and de-coupled first and second sub-systems 204a, 204b which both act on the yaw gear 202. The first sub-system 204a comprises a first pinion gear 206a, and a first drive motor 208a coupled to the yaw gear 202 by the first pinion gear 206a. The second sub-system 204b comprises a second pinion gear 206b, and a second drive motor 208b coupled to the yaw gear 202 by the second pinion gear 206b. The first and second pinion gears 206a, 206b mesh with the yaw gear 202 such that rotation of the yaw gear 202 causes rotation of the first and second pinion gears 206a, 206b, and vice versa.

In the case of FIG. 2 no gearboxes are shown, but in an alternative embodiment there may be a gearbox between each drive motor and its respective pinion.

Each motor 208a, 208b is controlled by a respective hydraulic circuit. Each hydraulic circuit comprises a pump 401a, 401b coupled to an oil tank 410. In this case the hydraulic circuits share a single oil tank 410, but alternatively each hydraulic system may have its own dedicated oil tank. In this case the hydraulic circuits have dedicated pumps, but alternatively the hydraulic circuits may share a single pump.

Each pump 401a, 401b pressurizes its respective hydraulic circuit via a respective direction valve 402a, 402b. Each direction valve 402a, 402b has three settings: a first drive setting in which it connects the high pressure line from the pump to a first side of the motor; a second drive setting in which it connects the high pressure line from the pump to a second side of the motor; and a closed setting in which the flow of oil is blocked to and from the motor. The drive settings enable each motor to be actively driven in either direction. The closed setting provides a hold function which restrains the motor and puts the yaw system into a stopped state.

Each hydraulic circuit also has a respective relief valve 403a, 403b which is ordinarily closed. If the pressure applied across the drive motor 208a, 208b is too high (if the pressure exceeds a threshold of the relief valves, for example) then the relief valve 403a, 403b opens, reducing the pressure across the drive motor and protecting the system from overload.

Thus the direction valves 402a, 402b provide the yaw system with a hold function (via their closed settings) to retrain yaw rotation for yaw moments below the threshold of the relief valves, and the relief valves 403a, 403b provide the yaw system with a yaw slippage function for yaw moments above the threshold of the relief valves.

The threshold of the relief valves is built into the design of the wind turbine 100 and/or acquired through calibration or measurement. The threshold of the relief valves may be set to a normal level, or to a reduced level which is less than the normal level.

In FIG. 2, each sub-system has only a single hydraulic drive motor and a single pinion, but in an alternative embodiment each sub-system may have multiple hydraulic drive each having an associated pinion. In this case there are two drive motors per sub-system but the principle may be extended to provide any number, for instance sixteen drive motors per sub-system. The drive motors of each sub-system are connected in parallel to their hydraulic circuit so that they can be driven together to simultaneously apply yaw moments to the yaw gear, or hydraulically locked by their direction valve to simultaneously react yaw moments from the yaw gear 202 to place the yaw system in a stopped state.

Figure 3:
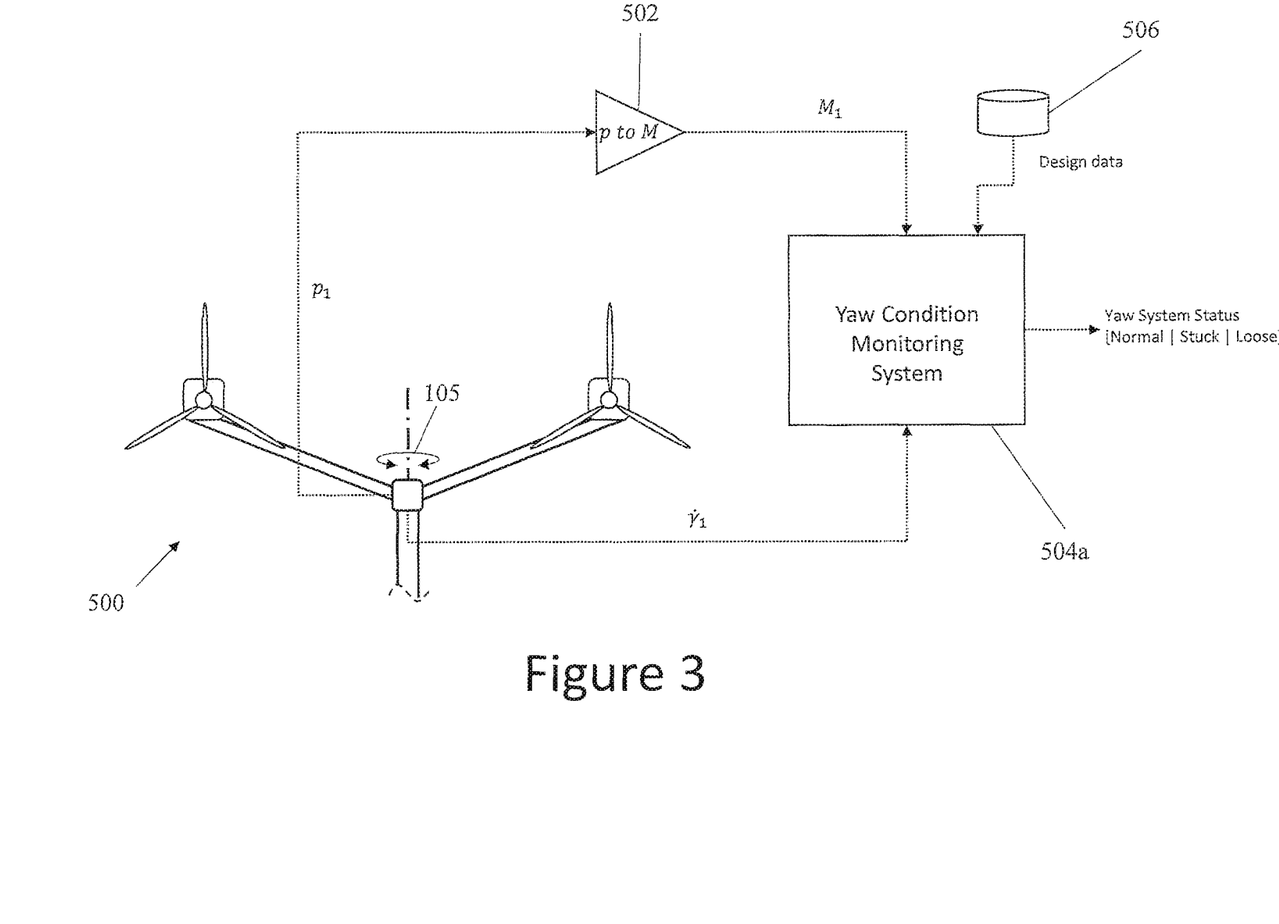
FIG. 3 shows a yaw condition monitoring system for monitoring the condition of the yaw system of FIG. 2.

The condition of the yaw system of FIG. 2 may be monitored by a yaw condition monitoring system 504a shown in FIG. 3. A magnitude of a yaw rotation speed parameter $\dot{\gamma}_1$, is used by the yaw condition monitoring system 504a in combination with a magnitude of a yaw moment parameter $M_1$ to evaluate whether the pair of parameters ($\dot{\gamma}_1$, $M_1$) deviates from an expected relationship defined by design data.

The yaw rotation speed parameter $\dot{\gamma}_1$ is obtained from the wind turbine at a time t1 by the yaw condition monitoring system 504a. The yaw rotation speed parameter $\dot{\gamma}_1$ can be any parameter indicative of a yaw rotation speed of the yaw rotation 105 at the time t1. For instance the yaw rotation speed parameter $\dot{\gamma}_1$ may be obtained by using an encoder 250 (shown in FIG. 2) or equivalent sensor to measure a yaw angle of the yaw gear 202 (or any other part of the wind turbine system which rotates during the yaw rotation 105) and differentiating the yaw angle measurement with respect to time. The encoder 250 may be attached directly to the yaw rim or attached to a high speed shaft of the yaw drive.

A yaw moment parameter $M_1$ is also obtained which is indicative of a yaw moment applied to the yaw system at the time $t_1$. In this case, the yaw moment parameter $M_1$ is obtained by measuring a hydraulic pressure, $p_1$ across the hydraulic motor of one of the sub-systems of FIG. 2 with a pressure gauge 404a, 404b shown in FIG. 2, and using an amplifier 502 to convert the hydraulic pressure $p_1$ into the yaw moment parameter $M_1$ (for instance by multiplying the hydraulic pressure $p_1$ by a constant gain factor).

Figure 4:
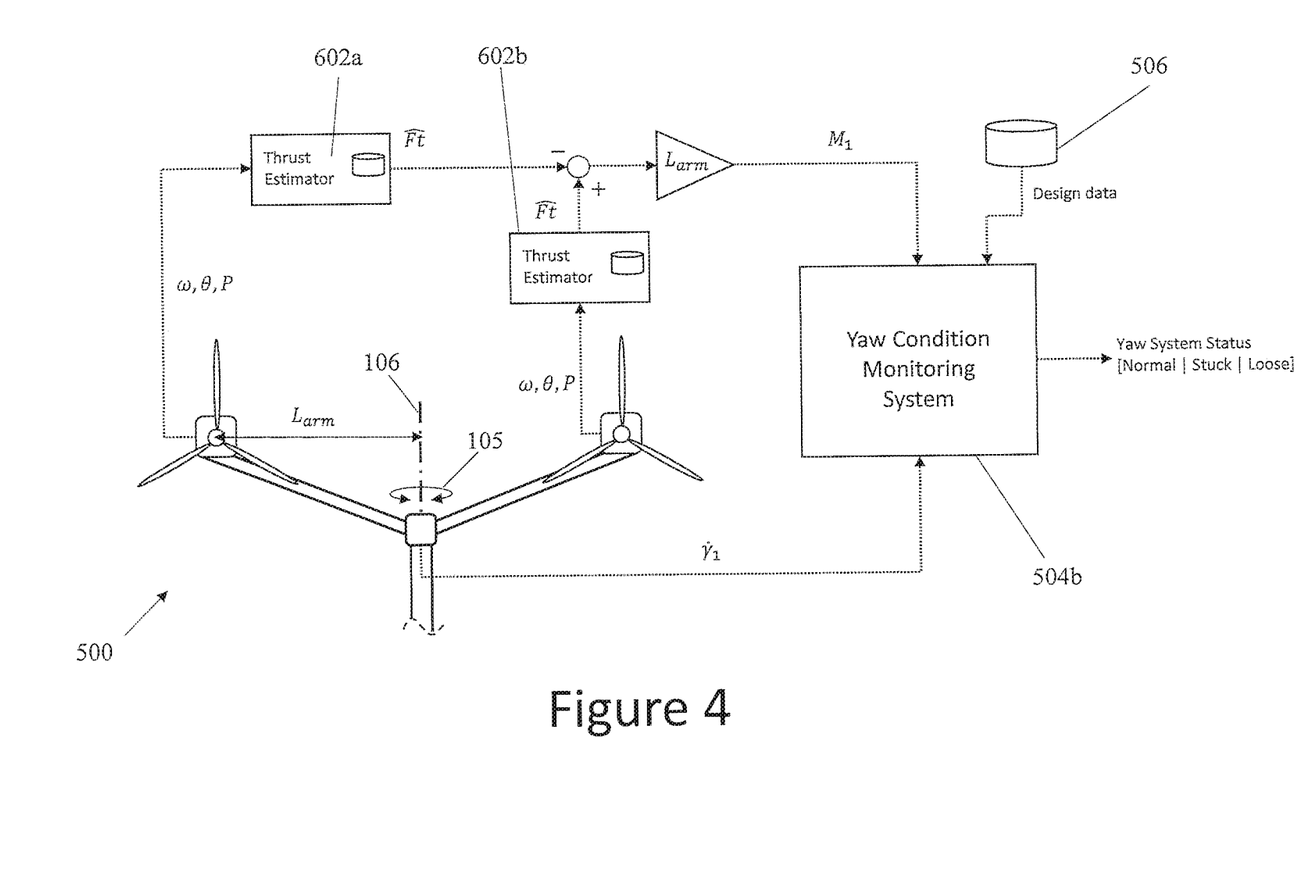
FIG. 4 shows an alternative yaw condition monitoring system for monitoring the condition of the yaw system of FIG. 2.

Alternatively the condition of the yaw system may be monitored by a yaw condition monitoring system 504b shown in FIG. 4. In this case the yaw moment parameter $M_1$ is obtained by determining a difference in thrust between the two rotors multiplied by an arm length $L_{arm}$ which is the distance from the yaw rotation axis 106 to the axis of the rotor. Additionally, acceleration sensors mounted on the structure (nacelle, arms and/or tower) could be used to account for the structural dynamics, with the aim of improving accuracy of the yaw moment estimation.

The thrust Ft acting on each rotor can be estimated e.g. using rotor speed ω, pitch angles θ, and generator power P, making use of turbine data such as drive train efficiency and aerodynamic coefficients. These values are obtained by sensors and are input into thrust estimators 602a, 602b that use the values to estimate the thrust experienced by each rotor. The difference in these thrusts is then calculated and multiplied by the arm length to give the yaw moment parameter $M_1$.

In the case of FIG. 3, the pair of parameters $\dot{\gamma}_1$ and $M_1$ can be obtained at any time.

That is, they can be obtained during normal operation of the wind turbine when the rotors are generating thrust, or alternatively during periods when the rotor is fixed or idle and not generating thrust. In fact the method of FIG. 3 may even be applied to the yaw control system before it is installed onto the tower along with the rotors. In the case of FIG. 4, the pair of parameters the parameters $\dot{\gamma}_1$ and $M_1$ can only be obtained during normal operation of the wind turbine, when thrust Ft is being generated.

In the case of FIG. 3 and FIG. 4, each pair of parameters $(\dot{\gamma}_1,M_1)$, $(\dot{\gamma}_2,M_2)$ is measured when the yaw system is in a stopped state with the direction valves 402a, 402b in their closed setting so that the pinion gears are opposing the yaw moment being applied to the yaw system. So any yaw rotation is caused by slippage of the yaw system. When the yaw moment is low then it is expected that there will be little or no yaw rotation, but as the yaw moment increases then some yaw rotation can be expected as the pressure in the hydraulic circuits increases towards the threshold of the relief valves 403a, 403b.

The yaw condition monitoring system 504a, 504b also receives design data from a local or remote memory or database 506. The yaw condition monitoring system compares each pair of parameters $(\dot{\gamma}_1,M_1)$, $(\dot{\gamma}_2,M_2)$ etc. to the design data, and determines a yaw system status based on the comparison. The yaw system status is indicative of whether there is a fault in the yaw system or not, and may indicate that the yaw system is normal, stuck or loose. This is described in greater detail below.

Figure 5:
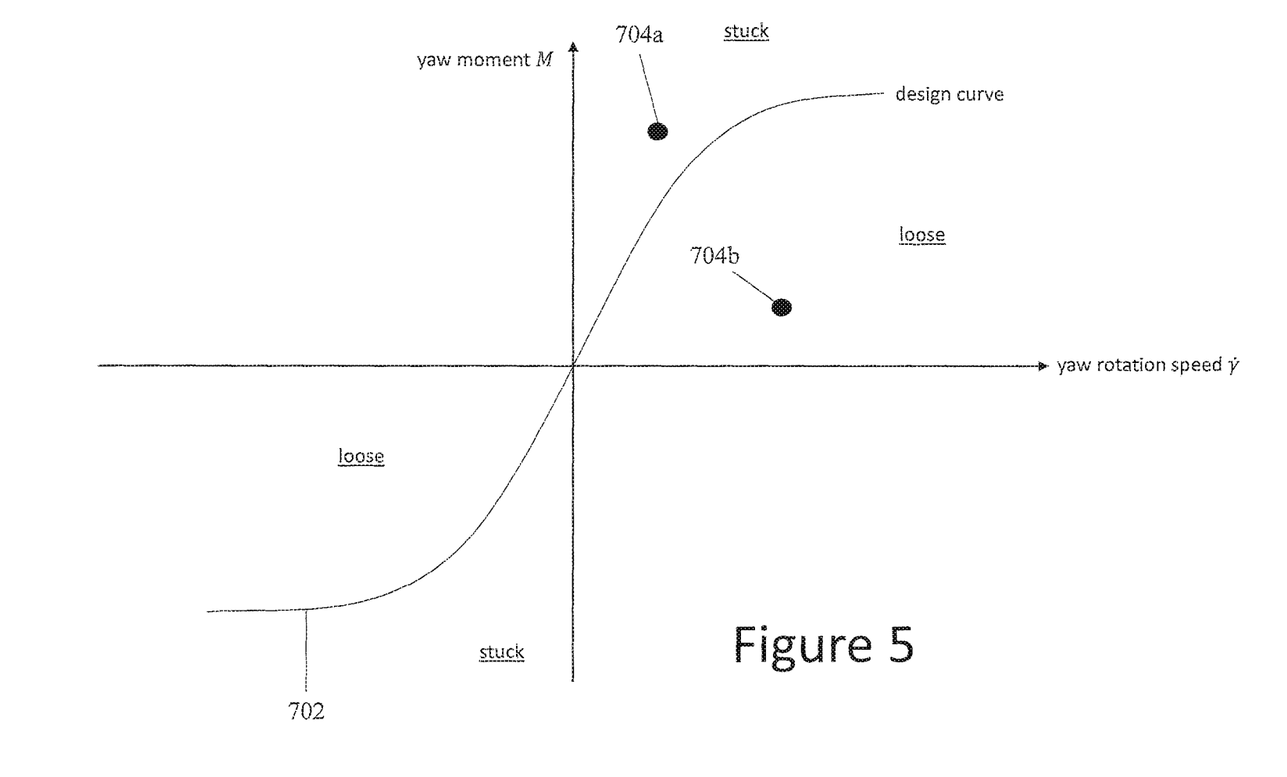
FIG. 5 is a graph showing two measurement points and a design curve.

FIG. 5 is a graph which provides a visual representation of the comparison between the design data and each pair of parameters that takes place in the yaw condition monitoring system 504. The design data in the database 506 may be a series of points, or a function, represented by a design curve 702 in FIG. 6. The design data is bivariate data indicative of an expected relationship between yaw moment and yaw rotation speed when the yaw system is in a stopped state. Note that the design curve 702 is shown schematically in FIG. 5, and in practice it may have a much higher gradient so that for small yaw moments only a very small amount of yaw rotation speed is expected.

A first measurement point 704a is shown in FIG. 5—for example this may represent the pair of parameters $(\dot{\gamma}_1,M_1)$ measured at time $t_1$. The measurement point 704a is above the design curve 702 so a lower than expected yaw rotation speed is being experienced. This may be indicative of a "stuck" fault condition in the yaw system.

A second measurement point 704b is also shown—for example this may represent the pair of parameters $(\dot{\gamma}_2,M_2)$ measured at time $t_2$. The measurement point 704b lies below the design curve 702 so a higher than expected yaw rotation speed is being experienced. This may be indicative of a "loose" fault condition in the yaw system.

Measurement points located in the lower-left quadrant of the graph of FIG. 5 follow the same principles as described above, with the "loose" and "stuck" regions indicated. It is worth noting that measurement points should not be obtained in the lower-right or upper-left quadrants of FIG. 5.

The yaw condition monitoring system 504 continuously acquires pairs of the parameters at times $t_1$, $t_2$ etc. to acquire a stream of data sets $(\dot{\gamma}_1,M_1,t_1)$, $(\dot{\gamma}_2,M_2,t_2)$ etc. and outputs a condition signal for each data set which indicates the condition of the yaw system.

Figure 6:
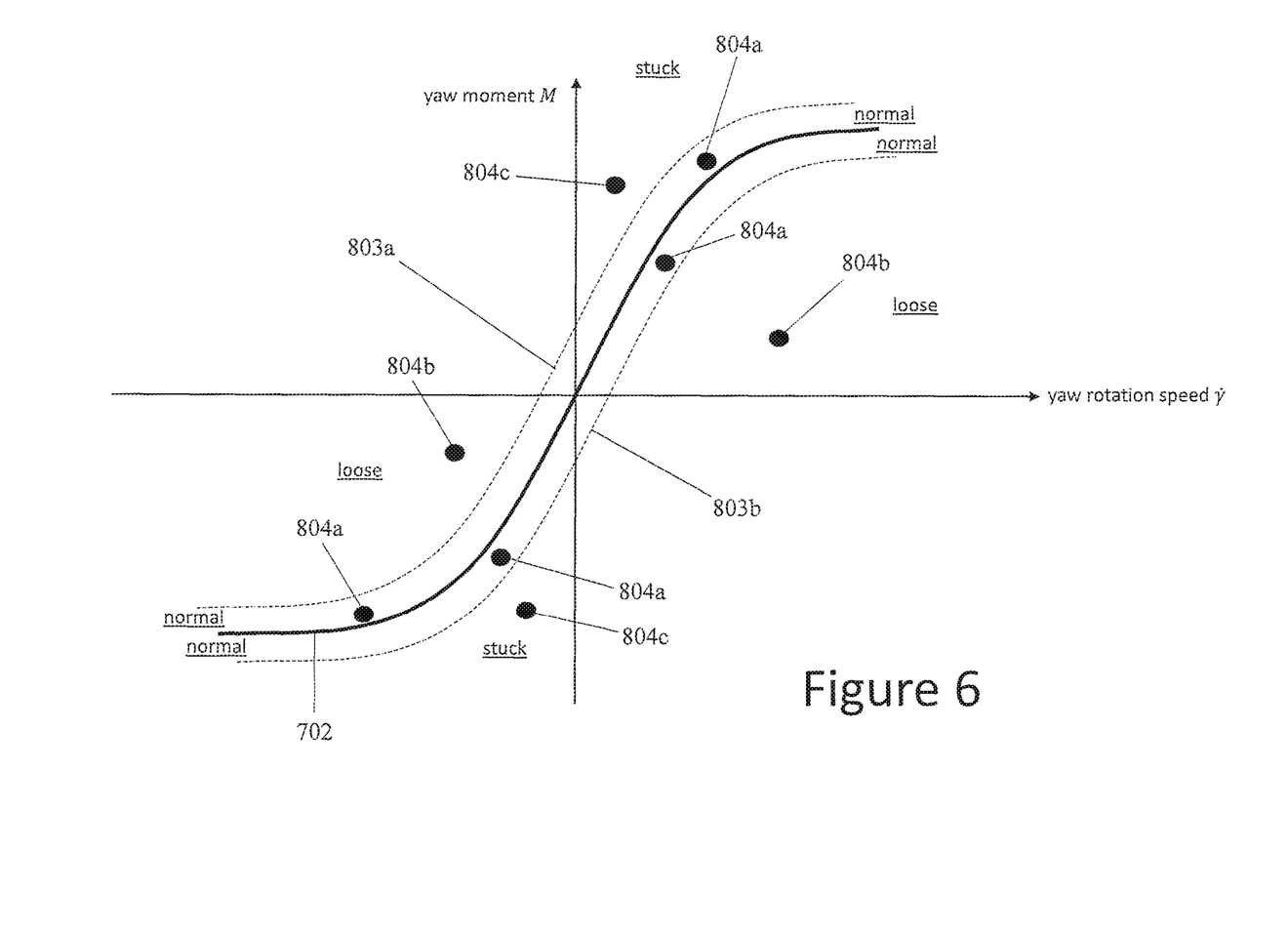
FIG. 6 is a graph showing multiple measurements points and areas corresponding with normal, stuck and loose conditions.

FIG. 6 shows in detail how measurement points may be assessed to determine whether there is a fault condition. FIG. 6 shows a pair of boundary curves 803a, 803b on either side of the design curve 702. The boundary curves 803a, 803b divide the bivariate parameter space of FIG. 6 into a normal region between them, and stuck and loose regions on either side as labelled in FIG. 6. The design data in the database 506 may define the boundary curves 803a, 803b in a similar manner to the design curve 702: that is as a series of points, or as a function. Alternatively the design data in the database 506 may define the boundary curves in terms of an offset from the design curve 702. Other methods may be envisaged by which the design data can define the various regions of FIG. 6, which enables the yaw condition monitoring system 504a, 504b to evaluate whether a given pair of parameters falls inside or outside a given region of the parameter space.

Measurements points 804a in the normal region between the boundary curves 803a, 803b do not deviate significantly from the design curve 702 so are deemed normal. Measurements points 804b with a higher than expected yaw rotation speed trigger a "loose" fault condition, and measurements points 804c with a lower than expected yaw rotation speed trigger a "stuck" fault condition.

In an alternative embodiment, only one of the boundary curves 803a, 803b may be provided. For instance only the upper boundary curve 803a may be provided, and the yaw condition monitoring system 504a, 504b only determines whether a measurement point is above the upper boundary curve 803a (in the case of the upper-right quadrant) and thus indicates a "stuck" fault condition. Alternatively only the lower boundary curve 803b may be provided, and the yaw condition monitoring system 504a, 504b only determines whether a measurement point is below the lower boundary curve 803b (in the case of the upper-right quadrant) and thus indicates a "loose" fault condition.

Determinations of stuck and loose fault conditions are indicative of a fault in the yaw system and further investigation and action will be required. For instance the wind turbine might be de-rated or stopped, or the fault may be communicated to a human operator via a display for example.

FIG. 2 shows a yaw control system with hydraulic drive motors, but in an alternative embodiment the yaw control system may be an electrical yaw control system which uses electric drive motors. In this case each sub-system has an electric motor which drives an input shaft on a high-speed side of a gearbox, and an output shaft on a low-speed side of the gearbox drives the pinion gear. In the hydraulic embodiment of FIG. 2, the drive train coupling the hydraulic motor to the yaw gear consists only of the pinion gear, but where a gearbox is provided then the drive train comprises not only the pinion gear but also the gearbox. A frictional yaw brake may act on the electric drive motor, or part of the drive train, to provide the necessary hold function for each sub-system. In this case the process described above tests the slippage operation of the frictional yaw brake.

In an alternative embodiment, the yaw system of FIG. 2 may have a mechanical locking device, such as a pin, which acts on part of the yaw system (such as the yaw gear 202) and can be actuated during maintenance to place the yaw system in a locked state in which there can be no yaw rotation. If the yaw system is in such a locked state, then the test procedure described above with reference to FIGS. 3 to 6 will not need not be performed, since the pin provides a failsafe locking function.

Although the invention has been described above with reference to one or more preferred embodiments, it will be appreciated that various changes or modifications may be made without departing from the scope of the invention as defined in the appended claims.

The invention claimed is:

1. A method of monitoring a condition of a yaw system of a wind turbine, the wind turbine comprising a rotor, the yaw system arranged to control a yaw rotation of the rotor, the method comprising:
   providing a design data curve, a first boundary curve on a first side of the design data curve, and a second boundary curve on a second side of the design data curve, wherein the design data curve represents an expected relationship between yaw moment and yaw rotation speed, and wherein the first boundary curve and the second boundary curve define a region of a parameter space;
   measuring a pair of parameters, the pair of parameters comprising a yaw moment parameter indicative of a yaw moment applied to the yaw system, and a yaw rotation speed parameter indicative of a yaw rotation speed caused by the yaw moment;
   evaluating whether the pair of parameters deviates from the expected relationship using the design data curve; and
   determining the condition of the yaw system on the basis of the evaluating step and whether the pair of parameters falls inside or outside the region of the parameter space.

2. The method of claim 1, wherein determining the condition of the yaw system comprises determining whether the yaw system is in a normal condition or a fault condition.

3. The method of claim 2, wherein the fault condition is a stuck fault condition associated with an abnormally low yaw rotation speed.

4. The method of claim 2, wherein the fault condition is a loose fault condition associated with an abnormally high yaw rotation speed.

5. The method of claim 1, wherein determining the condition of the yaw system on the basis of the evaluating step comprises determining whether the yaw system is in a normal condition, a stuck fault condition associated with an abnormally low yaw rotation speed, or a loose fault condition associated with an abnormally high yaw rotation speed.

6. The method of claim 1, wherein the yaw system comprises a hydraulic motor connected to a hydraulic circuit, and the yaw moment parameter is measured by measuring a hydraulic pressure of the hydraulic circuit.

7. The method of claim 1, wherein the wind turbine comprises plural rotors, and the yaw moment parameter is measured by estimating a thrust difference between the rotors.

8. The method of claim 1, wherein the pair of parameters is measured when the yaw system is in a stopped state in which the yaw system is opposing the yaw moment applied to the yaw system, and the yaw rotation speed is caused by a slippage of the yaw system.

9. The method of claim 1, wherein as the pair of parameters is measured the rotor is generating thrust.

10. The method of claim 1, wherein a time series of pairs of parameters is measured, each pair of parameters comprising a yaw moment parameter indicative of a yaw moment applied to the yaw system at a respective time and a yaw rotation speed parameter indicative of a yaw rotation speed caused by the yaw moment at the respective time, and wherein each pair of parameters is evaluated to determine the condition of the yaw system at the respective time.

11. The method of claim 1, wherein the yaw rotation speed parameter is obtained by measuring a yaw rotation speed of the yaw system.

12. The method of claim 1, wherein a magnitude of the yaw rotation speed parameter is used in combination with a magnitude of the yaw moment parameter to evaluate whether the pair of parameters deviates from the expected relationship.

13. A monitoring system for monitoring the condition of a yaw system of a wind turbine, wherein the monitoring system is arranged to monitor the condition of the yaw system by performing the method of claim 1.

14. A wind turbine comprising:
   a rotor;
   a yaw system coupled to the rotor so that the yaw system controls yaw rotation of the rotor; and
   a monitoring system according to claim 13 arranged to monitor the condition of the yaw system.

15. A method of monitoring a condition of a yaw system of a wind turbine, the wind turbine comprising a rotor, the yaw system arranged to control a yaw rotation of the rotor, the method comprising:
   providing a design data curve representing an expected relationship between yaw moment and yaw rotation speed;
   measuring a pair of parameters, the pair of parameters comprising a yaw moment parameter indicative of a yaw moment applied to the yaw system, and a yaw rotation speed parameter indicative of a yaw rotation speed caused by the yaw moment;
   evaluating whether the pair of parameters deviates from the expected relationship using the design data curve; and
   determining the condition of the yaw system on the basis of the evaluating step and whether the pair of parameters falls on or off of the design data curve.

* * * * *